United States Patent [19]
Godse et al.

[11] Patent Number: 5,974,048
[45] Date of Patent: Oct. 26, 1999

[54] DISTRIBUTED DATA PROCESSING SYSTEM

[75] Inventors: Dhananjay Damodar Godse, Kanata; William Anthony Gage, Stittsville, both of Canada

[73] Assignee: Nortel Networks Corporation, Montreal, Canada

[21] Appl. No.: 08/786,948

[22] Filed: Jan. 23, 1997

[51] Int. Cl.$^6$ .................................................. H04L 12/28
[52] U.S. Cl. ............................................. 370/396; 370/471
[58] Field of Search ..................................... 370/395, 396, 370/397, 420, 465, 471; 395/652, 200.51

[56] References Cited

U.S. PATENT DOCUMENTS

| | | | |
|---|---|---|---|
| 5,504,744 | 4/1996 | Adams et al. | 370/60.1 |
| 5,648,958 | 7/1997 | Counterman | 370/458 |
| 5,673,262 | 9/1997 | Shimizu | 370/395 |
| 5,794,031 | 8/1998 | Nakadai | 395/652 |
| 5,802,287 | 9/1998 | Rostoker et al. | 395/200.8 |

FOREIGN PATENT DOCUMENTS

WO 94/28660  12/1994  WIPO .......................... H04L 12/56

OTHER PUBLICATIONS

"User–to–Network Interface (UNI) Signaling" Implementation Agreement, Version 4.0 (Draft), ATM Forum Technical Committee, Signaling Subworking Group, ATM Forum/94–1018R4, Jul. 11–13, 1995, pp. 1–87.

Chao, H.J. et al., "A Packet Video/Audio System Using the Asynchronous Transfer Mode Technique", IEEE Transactions on Consumer Electronics, vol. 35, No. 2, May 1989, pp. 97–105.

Johnson, C.A. et al., "Functional Reference and Signaling Protocol Architectures for a Broadband CPN", Telecommunication Access Networks: Technology and Service Trends Proceedings of the IX International Symposium (ISSLS) Amsterdam, Apr. 22–26, 1991, No. Symp. 9, pp. 364–370.

Pauwels, B., "Signalling on the Broadband Subscriber Access", Communications Technology for the 1990's and Beyond, Dallas, Nov. 27–30, 1989, vol. 3, No. –, Institute of Electrical Engineers, pp. 1815–1819.

Pauwels, B., "A Flexible Customer Premises Network Concept Based on ATM Principles", Proceedings of the International Symposium on Subscriber Loops and Services, (ISSLS), Boston, Sep. 11–16, 1988, No. Symp 8, pp. 246–250.

*Primary Examiner*—Hassan Kizou
*Assistant Examiner*—Clement Townsend
*Attorney, Agent, or Firm*—Growling, Strathy & Henderson; Yoshiharu Toyooka

[57] ABSTRACT

An arrangement for connecting a device or end system to an ATM network incorporates a device controller coupled to the end system via first and second virtual channels across the network. The device controller discovers and boots the end system via the first virtual channel and performs proxy signalling means via the second virtual channel for on behalf of the end system.

8 Claims, 15 Drawing Sheets

ES=End system=the consumer/generator of the cells at the downstream,m (leaf) of a network
UES=Upstream end system=the consumer/generator of the cells at the upstream (root) of a network

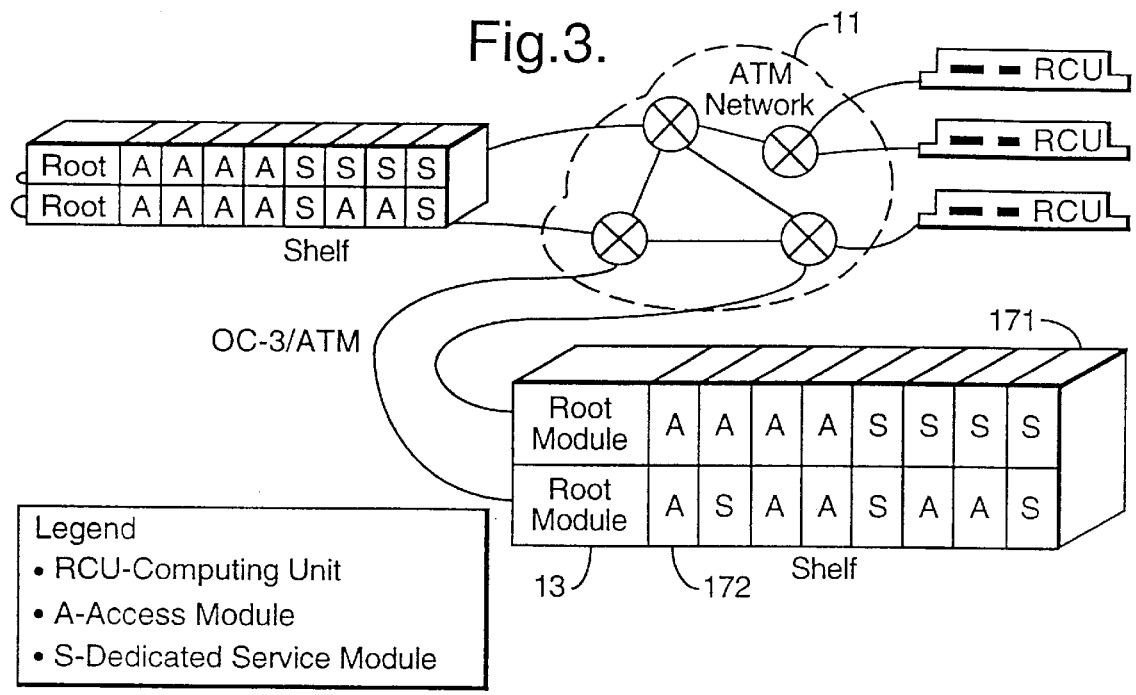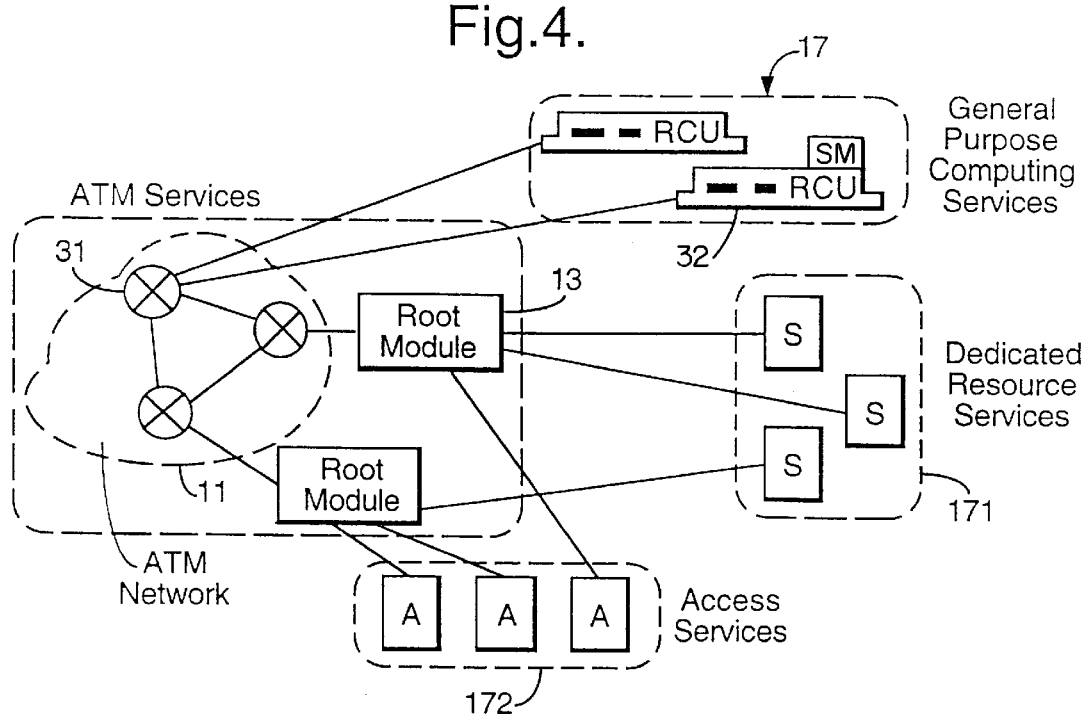

NOTE: RCUs have a Q.2931 stack in ROM. Access and Resource modules have no Q.2931 software on board.
NOTE: Dedicated Rainbow System Management (RSM) RCUs will not have the Simple Device Protocol.

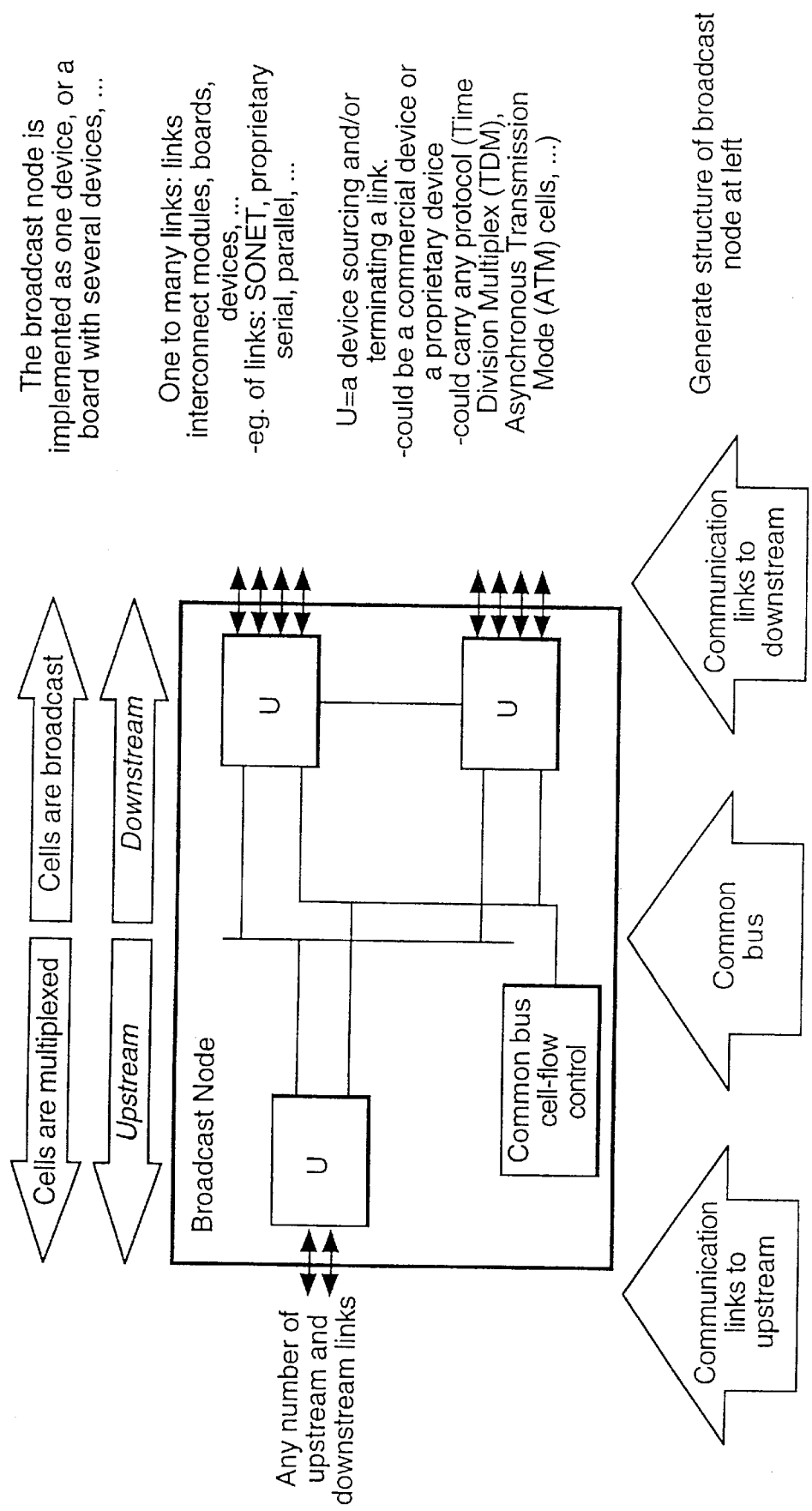

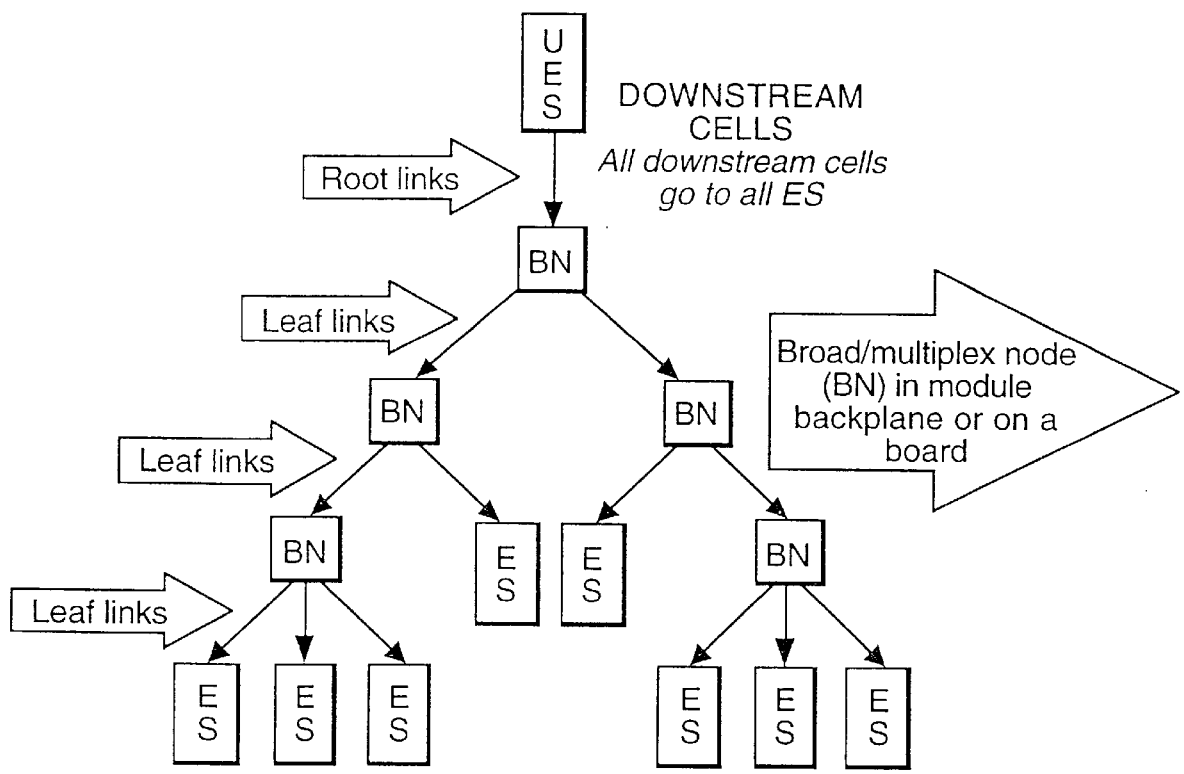

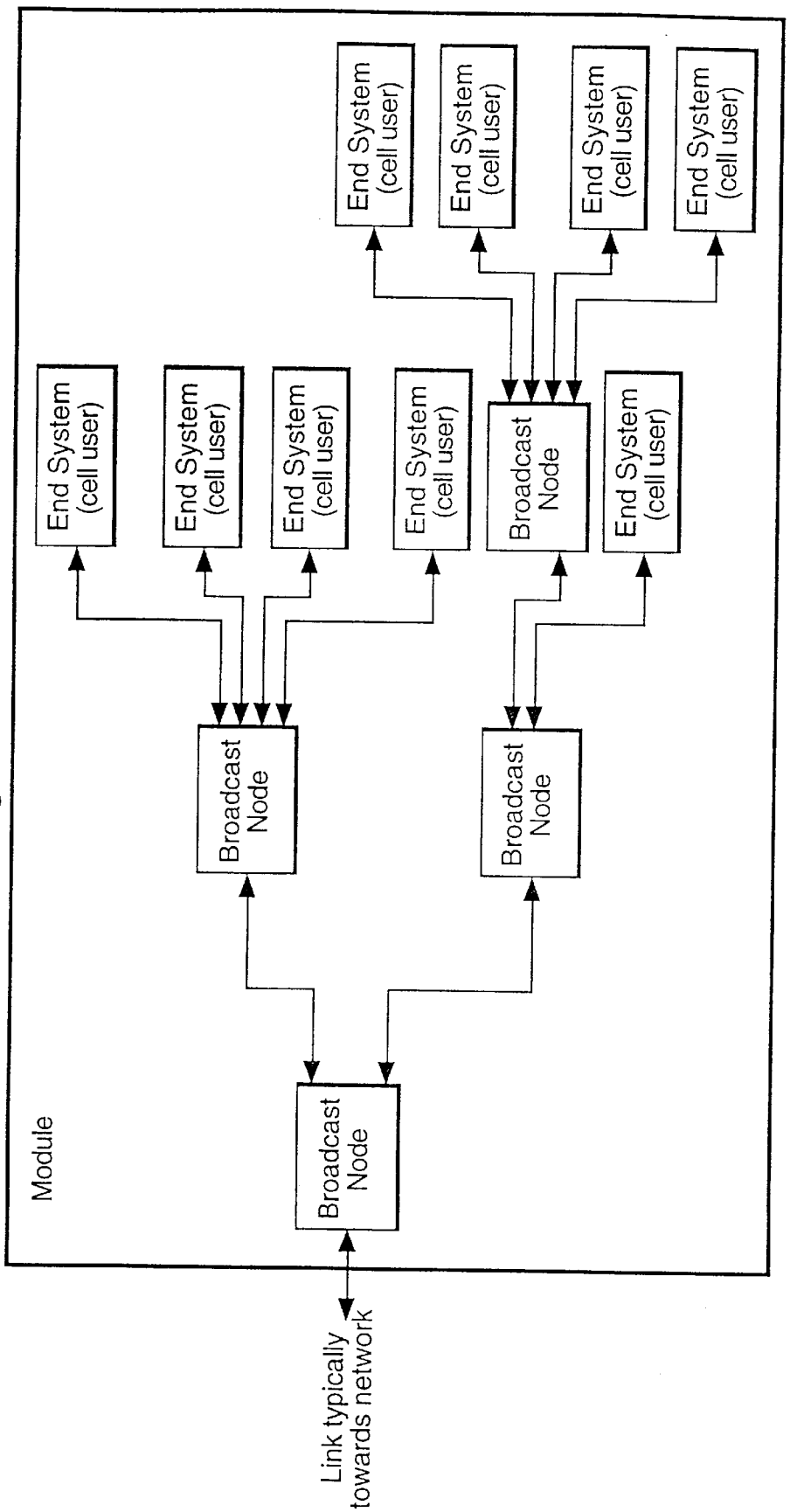

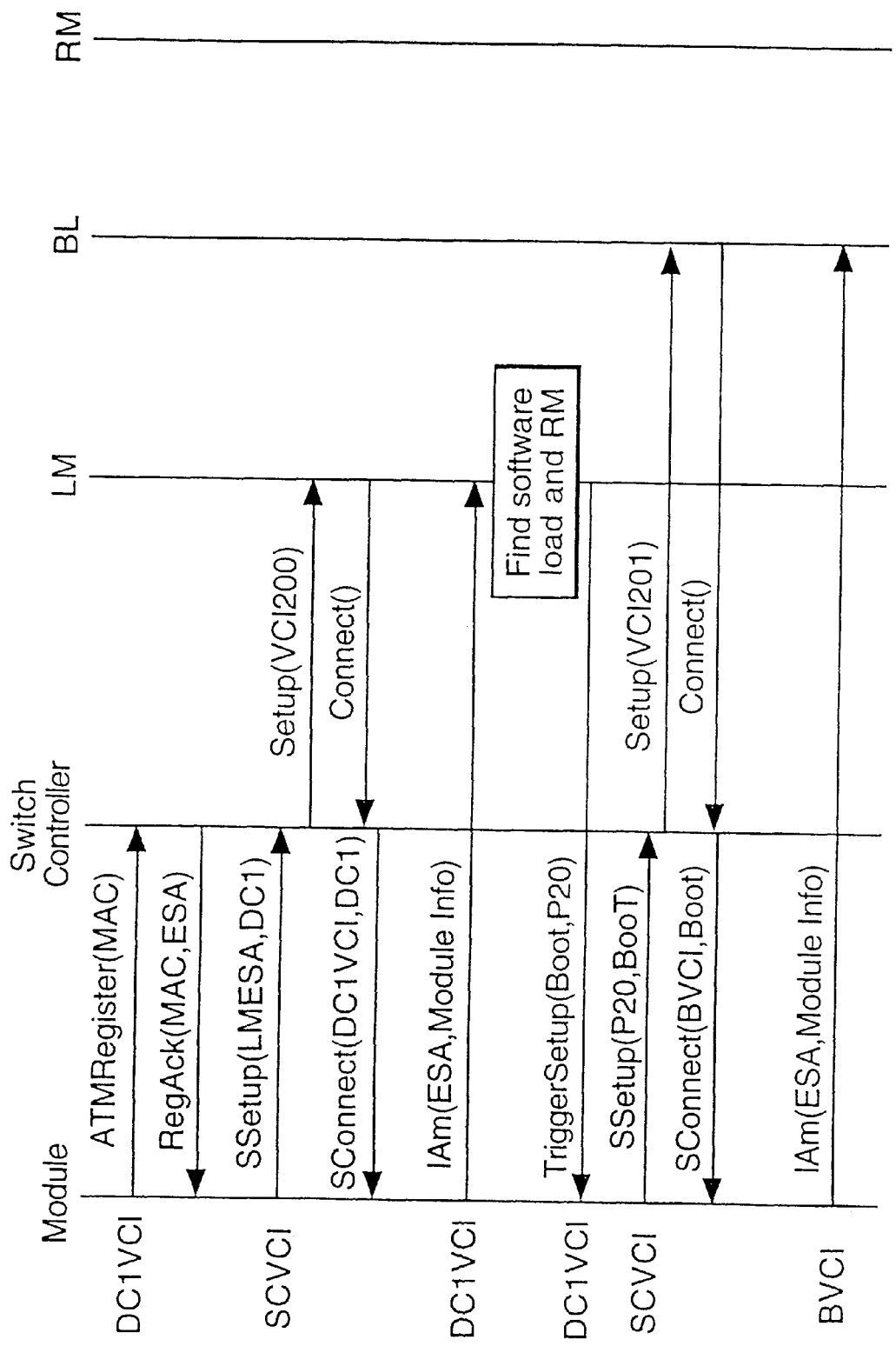

Fig.16. The protocol by which an end system registers with an ATM network and acquires its end system address. The messages only come on SCVCI

| 5 | 6 | 1 | 2 | 4 | 3 | 3 | 20 | 8 |
|---|---|---|---|---|---|---|---|---|
| ATN Header | Device MAC | Sub-Address | Virtual Reg No. | Register Value | Pad | B-HLI | ESA | AAL5 |
| ✓ | ✓ | X | ✓ | X | X | X | X | — |
| ✓ | ✓ | X | ✓ | X | X | X | ✓ | — |
| | | | ATMRegister | | | | | |
| | | | ATMRegisterAck | | | | | |

The ATMRgister() message is filled in with the MAC address of the resource device, and the message is sent. An ATMRegisterAck() is returned with the End System Address of the end system. ATM Registration is done on a well known VCI (SCVCI) that connects to the controller of the Root Module. (The Connection Protocol also uses SCVCI).

Fig.18. The single-cell protocol by which a resource device sets up simple connections. The messages only come on SCVI

| 5 | 6 | 1 | 2 | 4 | 3 | 3 | 20 | 8 |
|---|---|---|---|---|---|---|---|---|
| ATN Header | Device MAC | Sub-Address | Virtual Reg No. | Register Value | Pad | B-HLI | ESA | AAL5 |
| ✓ | ✓ | 0 | ✓ | X | X | X | ✓ | — |
| ✓ | ✓ | 0 | ✓ | ✓ | X | ✓ | X | — |
| ✓ | ✓ | 0 | ✓ | ✓ | X | X | X | — |
| | | | SSetup | | | | | |
| | | | SConnect | | | | | |
| | | | SDisconnect | | | | | |

SSetup() is sent to connect a service (via a virtual register number) to a service access point {B-HLI, ESA}.

SConnect() is received for getting the VPI/VCI for the Service (Register Number).

SDisconnect() is sent or received to disconnect a service (on the VPI/VCI).

Message Sequence Chart (MSC) for the ATM registration

MSC for the simple connection protocol (setup):

DISTRIBUTED DATA PROCESSING SYSTEM

This invention relates to distributed data processing systems in which a number of data processing elements are interconnected via a network. The invention further relates to a method of operating such systems.

BACKGROUND OF THE INVENTION

Distributed data processing systems are widely used e.g. in networked computer applications. In such systems a plurality of workstations can access one or more servers to utilise data and or applications stored thereon. The network interconnecting the various system elements may comprise a dedicated network, or, more advantageously, a non-dedicated telecommunications network having appropriate bandwidth for carrying data traffic. A recent development in telecommunications technology has been the introduction of the asynchronous transfer mode (ATM) transmission protocol. In an ATM system, digitised traffic is packed into cells each containing a header portion containing virtual channel information for routing the packet to the desired destination. These cells are then routed across the ATM network and are subsequently unpacked to recover the data. Because the cells are assembled in an essentially asynchronous manner, the process is particularly advantageous for the transport of data.

Attempts to introduce ATM technology to distributed data processing systems has not been entirely successful for a number of reasons. Firstly, there is the problem of initial attachment to the network. In a conventional ATM network, every end system requires a unique address for receiving cells and must also access the network management system so that the launch of completed cells into the network from that end system can be controlled. This discovery and booting of an end system currently requires manual intervention which is slow and costly for a network operator and is inconvenient for the customer. Secondly, there is a requirement for an interface between the end system and the ATM network. Building a full ATM interface on each end system is expensive as a large volume of software is required on the end system.

In an attempt to address these problems it has been proposed that a proxy signalling provision in the ATM UNI version 4.0 Standard would allow a third party to perform Q.2931 signalling on behalf of an end system. However, this proposal still requires manual intervention to set up this feature as a special service and it requires manually provisioning a virtual channel (VC) from the proxy to the end system to instruct the end system on which virtual channel indicator (VCI) it should respond to. A further proposal requires the use of established addresses and ILMI protocols to discover a newly connected end system. However, this requires that the end system is self booting and has a Q.2391 protocol stack thus resulting in a relatively complex and costly arrangement.

SUMMARY OF THE INVENTION

An object of the invention is to minimise or to overcome these disadvantages.

It is a further object of the invention to provide a distributed data processing system in which newly connected end systems are automatically discovered and booted.

According to one aspect of the invention there is provided an arrangement for connecting a device or end system to an ATM network, the arrangement comprising a device controller coupled to the end system via first and second virtual channels across the network, and wherein the device controller has means for discovery and booting of the end system via the first virtual channel and proxy signalling means coupled to the end system via the second virtual channel.

According to another aspect of the invention there is provided a method of connecting a device or end system via a device controller to an ATM network, the method comprising providing first and second virtual channels between the device controller and the end system, discovering and booting the end system via the first virtual channel, and providing proxy signalling for the end system via the second virtual channel.

The arrangement avoids the requirement for complex management software such as Q.2931 on the device. The device controllers a provide proxy signalling function which is fault-tolerant because both master and spare device controllers are connected to the device and the control and proxy signalling VCs are dynamically allocated.

In our arrangement, a simple device protocol is used to connect a device to its device controller and to download software and configuration data so that the device appears as an intelligent ATM end system. This protocol is designed for:

Simple message semantics not requiring a device to maintain state information;

Single cell messaging; and

Genericity in which messages are generic for any resource device.

The simple device protocol allows the devices to act as autonomous ATM end-systems by:

a) Using SDP address registration to acquire an ATM address.

b) Using SDP metasignalling to acquire an ATM standard signalling VCI. The standard VCI cannot be used because the VCI is shared between the devices, and ATM standard signalling messages are multi-cell messages which could become hopelessly interleaved by the cell multiplexer. Each device therefore needs a separate VCI for signalling.

c) Using SDP triggering and connection set-up to connect to a remote device controller that can make the device appear intelligent to the network by using the proxy signalling mechanism.

d) Using SDP virtual register access to tell a device which VCI to listen to for bearer traffic. This VCI would not be shared with other devices. The cell multiplexer will broadcast the cells to other devices, but they will only accept cells from VCIs that they have been told to accept.

The signalling proxy, i.e. the device controller sends signalling messages to devices via the proxy signalling VCI (PSVCI). From previous steps in the process, the device receiving the proxy signalling message has already been instructed as to what the PSVCI is and that it used meta-signalling to determine the correct standard signalling VCI to use. The device then knows to take cells from the PSVCI, translate the VCI in the header to the standard signalling (Q.2931) VCI, and send those cells to the ATM network. As far as the ATM network is aware, these cells appear to have come from the corresponding device as they have been received over the standard signalling VCI.

The arrangement allows a user to plug a device or end system into an ATM network and have the device booted by the network, brought into service, connected to the network management system, be individually addressable, and appear to be able from the perspective of the ATM network to participate in standard ATM signalling protocols. Further, a plurality of end systems may share a port on an ATM network and thus share a VPI/VCI address space. The arrangement obviates the need to provide the end system with protocol stacks and with significant intelligence.

Reference is here directed to our copending application Ser. No. 08/786,949 filed on Jan. 23, 1997. (J Godse et al. 1-1-1-8) of even date which relates to an arrangement and method for the automatic discovery and booting of an end system coupled to an ATM network.

BRIEF DESCRIPTION OF THE DRAWINGS

An embodiment of the invention will now be described with reference to the accompanying drawings in which:

FIG. 3 illustrates the physical architecture of the arrangement of FIG. 2;

FIG. 4 illustrates the logical architecture of the arrangement of FIG. 2;

FIG. 7 illustrates the general construction of a broadcast node for use in the root module of FIG. 6;

FIGS. 8a and 8b illustrate respectively the downstream and upstream functionality of the broadcast node of FIG. 7;

FIG. 9 illustrates a typical configuration of broadcast nodes within the root module of FIG. 6;

FIGS. 10 to 14 illustrate a messaging sequence employed on plug-in of a module into the network arrangement of FIG. 2;

FIG. 16 illustrates an ATM registration protocol used in the connection of an end system to the network arrangement of FIG. 2;

FIG. 18 illustrates a single cell connection protocol used in the connection of an end system.

DESCRIPTION OF PREFERRED EMBODIMENT

Figure 1:
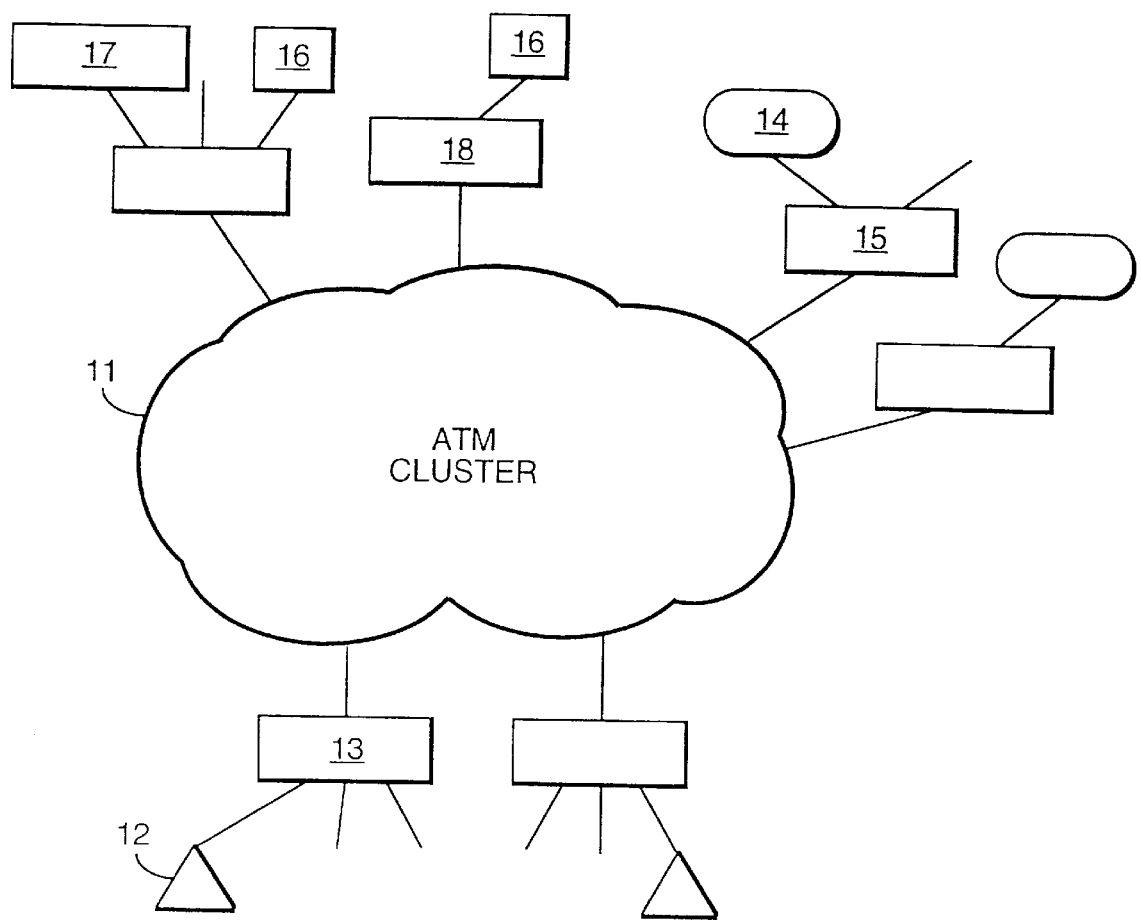
FIG. 1 is a schematic view of an ATM network structure incorporating an end user connection arrangement according to the invention.

Referring first to FIG. 1, there is shown in highly schematic form a communications network arrangement in which an ATM network or cluster 11 provides communications paths between a variety of entities coupled to the cluster. Thus, network communication may be provided between voice terminals 12 via voice interfaces 13, between video terminals 14 via video interfaces 15, and between data terminals 16 and data resource devices 17, collectively referred to end systems, via data interfaces or root modules 18. The interfaces 13, 15 and 18 assemble traffic into cells for launch into the cluster 11 and unpack cells received from the cluster for delivery to an appropriate destination. The ATM cluster 11 requires little intelligence and functions primarily as a transmission pipeline providing communications paths of appropriate capacity on demand. The cluster 11 has no knowledge of the nature of the traffic contained in the transported cells but merely delivers these cells to the respective interface determined by the cell address headers. In the following description reference will be made to the provision of data communication via the cluster, but it will be understood that the cluster will not in general carry this type of traffic to the exclusion of other types.

Figure 2:
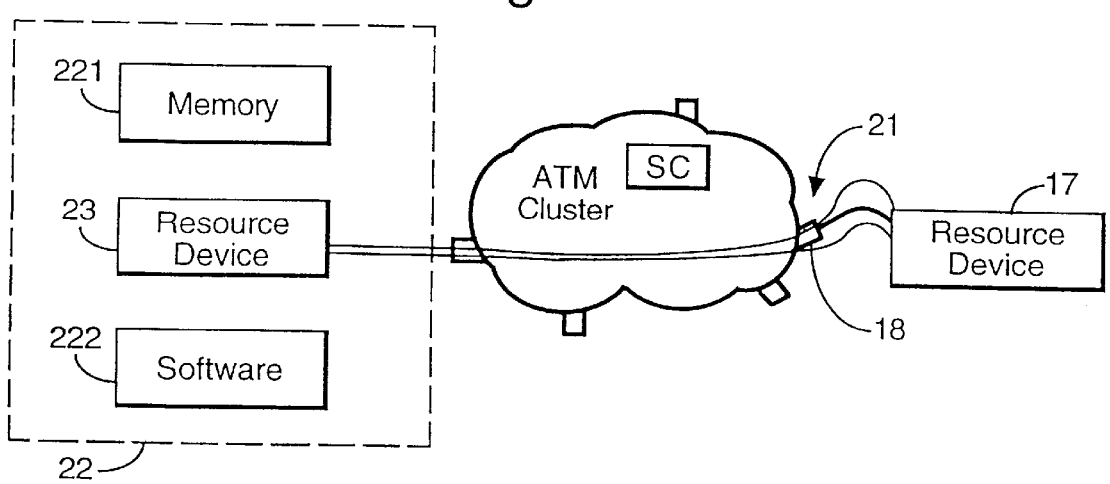
FIG. 2 illustrates the use of the network of FIG. 1 to provide interconnection between data terminals to provide a distributed data processing network.

Referring now to FIG. 2, the ATM cluster 11 has a number of access ports 21 at least some of which are provided with a respective data access interface or root module 18. Each root module provides an interface between the ATM cluster and one or more resource devices or end systems 17 to provide access to those devices from customer terminals. Typically each resource device performs a single function requires no complex software.

The network arrangement also incorporates an intelligent node 22 having memory facilities 221 and complex software facilities 222 and to which a device controller 23 is coupled. This device controller acts on behalf of the resource devices 17 when interacting with other system entities and functions as a virtual entity that communicates with the system manager 24. A pair of virtual channels (VCs) is provided between the device controller 23 and each resource device 17. One of these virtual channels, VCa, is used for control purposes and the other, VCb, is available for proxy signalling. A schematic description of the proxy signalling procedure is shown in FIG. 3. The device controller signals on behalf of the resource device such that the network thinks that the resource device itself is performing the signalling. In a preferred arrangement, a reserve device controller (not shown) may be provided to maintain service to customers in the event of failure of the main device controller.

Figure 5:
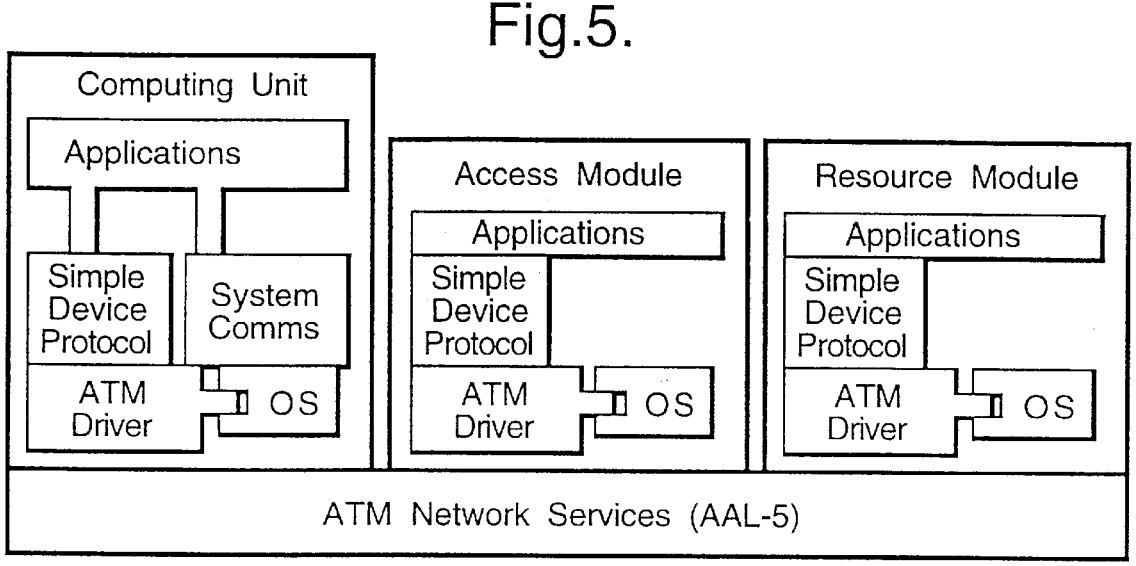
FIG. 5 illustrates the software architecture of the various types of end system units employed in the network arrangement of FIG. 2.

The physical and logical structure of the ATM network arrangement of FIG. 2 are shown respectively in FIG. 4 and FIG. 5. As shown in FIG. 4, each root module 13 provides a coupling between the ATM cluster 11 and a number of end systems 17 each comprising e.g. a dedicated service module 171 or an access module 172. Each root module 13 functions essentially as an ATM switching node to provide ATM-UNI services to the modules or end systems to which it is connected and is coupled to one or more ATM switches 31 forming part of the ATM cluster 11. Further, each root module 13 can comprise either a switching root module or a broadcast root module. A switching root module is essentially an ATM switch. The functionality of a broadcast root module will be described below.

In the physical architecture of FIG. 3, the dedicated service modules 171 each perform a specific dedicated function e.g. digital signal processing. The access modules 172 provide external access to the network and convert external formats to the ATM format.

The network may also provide access to a number of general purpose computer units or servers 32 one or more of which may be dedicated to the provision of a single service. These general purpose computer units may be coupled directly to the ATM cluster 11 via respective ATM switches 31.

The system is managed by a system manager (SM) which resides on one of the computer units or servers 32 and performs the following functions:

Discovery Management

The discovery manager accepts identification in the form of IAm messages and activates the appropriate virtual entity.

Downloading

The downloader incorporates software or data loads. It downloads various end systems. One downloader is required on the main system manager, but others may exist elsewhere in the network.

Management Unit

This is constituted by a system manager resident proxy managed object (PMO), a device controller or real time managed object (RMO) and a hardware device. The PMO is responsible for downloading the device, activating its device controller and connecting the device controller to the device.

The corresponding logical architecture is shown in FIG. 4 and comprises four principal services.

1. An ATM service comprising ATM transport and ATM connection management is provided by the root modules 18.

2. Access services to the ATM cluster are provided by the access modules 172.

3. Dedicated resources comprising specialised services for the network are provided the dedicated service modules 171. Connection to these services is effected only via the ATM network.

4. General purpose computing services are provided on demand via the servers 32.

A software architecture for the various types of end system or module employed in the network arrangement is shown schematically in FIG. 5. Each end system incorporates a set of software modules which, together with the system hardware components, provide an ATM based dynamically reconfigurable distributed computing system. These software modules are detailed below.

ATM network services include end system registration, connection set-up and ATM cell transport.

The operating system (OS) provides operating system functionality.

The ATM driver interfaces to the ATM network and assigns connections to higher layers.

The system communications (SC) provides transport and locator services over ATM, including the ability to address software entities uniquely over a multi-node network. This communications module is provided only in the computing units of the system.

The simple device protocol (SDP) is a single cell protocol used to control access and resource devices. Applications trying to communicate with these devices use SDP to bypass the system communications.

Applications comprise the value added software of the network and use the system communications for most purposes. Those applications that need to communicate directly to access or resource modules use the simple device protocol.

Figure 6:
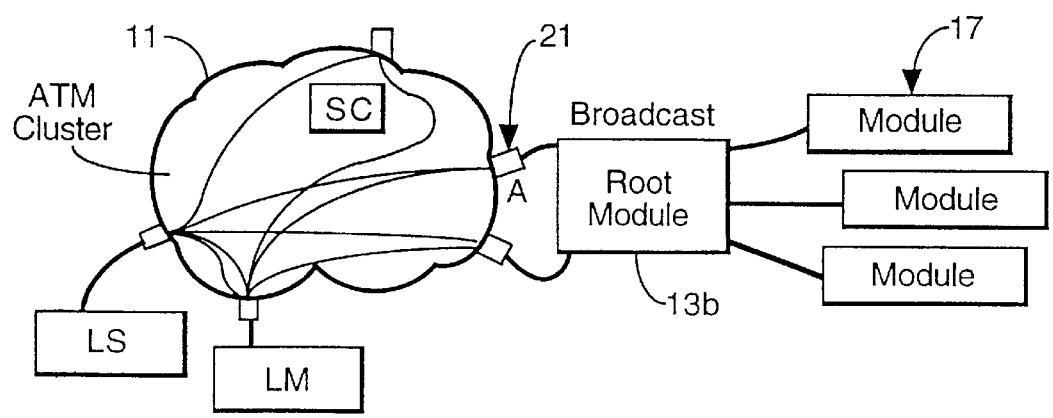
FIG. 6 illustrates the operation of a broadcast root module in the arrangement of FIG. 2.

The functionality of a broadcast root module referred to above is illustrated in FIG. 6. Referring to this figure, a broadcast root module 13b provides an interface to a number of end systems 17 so as to route ATM cells from each end system to a respective port 21 on the ATM cluster and so as to broadcast cells from that port to the connected end system. Each end system sees both its own incoming cells and those intended for the other end systems connected to the broadcast root module.

The broadcast root module can be considered as a switching element (SE) of the ATM cluster 11. From the point of view of the root module, the module is effectively a port on the cluster. From the point of view of the ATM cluster, the root module has the following attributes and interacts with the cluster in the following way.

1. The module is effectively a switching element that shares one VPI/VCI address space among its ports. I.e. the broadcast module functions as an end system multiplexer.

2. Because of the shared address space, the network provides a metasignalling protocol that accepts single cell requests for a signalling VC and returns the virtual channel indicator (VCI) to be used for signalling.

3. The network manages alternate routing of VCs to the redundant network links of the root module.

4. The provisioning and configuration of the root module is effected as part of the ATM cluster network element provisioning protocol.

The metasignalling protocol referred to above is a simple interface that accepts a single cell from the single cell connection protocol (S-Setup) request on the single cell signalling VC (SCVCI) to connect to a ESA MSESA. It returns a VCI to be used for standard ATM signalling. Because many systems may be on a broadcast root module, and therefore share a VPI/VCI address space, the MAC address of each end system is always included. The switch controller sets up a VC to the end system, transmits the end system VCI back to the end system, and records which end system maps to which signalling channel on the switch controller.

Referring now to FIGS. 7, 8a, 8b and 9, these illustrate the general functionality of a broadcast node and its use in a broadcast root module. The general detail of the broadcast node is illustrated in FIG. 7. The node provides sequential multiplexing of cells in the upstream direction and broadcast of cells in the downstream direction. The processing of upstream and downstream cells between upstream and downstream termination devices 71,72 is controlled via a common bus cell flow controller 73. Typically the node supports the full-duplex band width of the upstream link and requires no routing tables or other state information. Advantageously, the broadcast node operates as a stand-alone device, e.g. in a backplane to replicate a single link to multiple links.

Figure 8B:
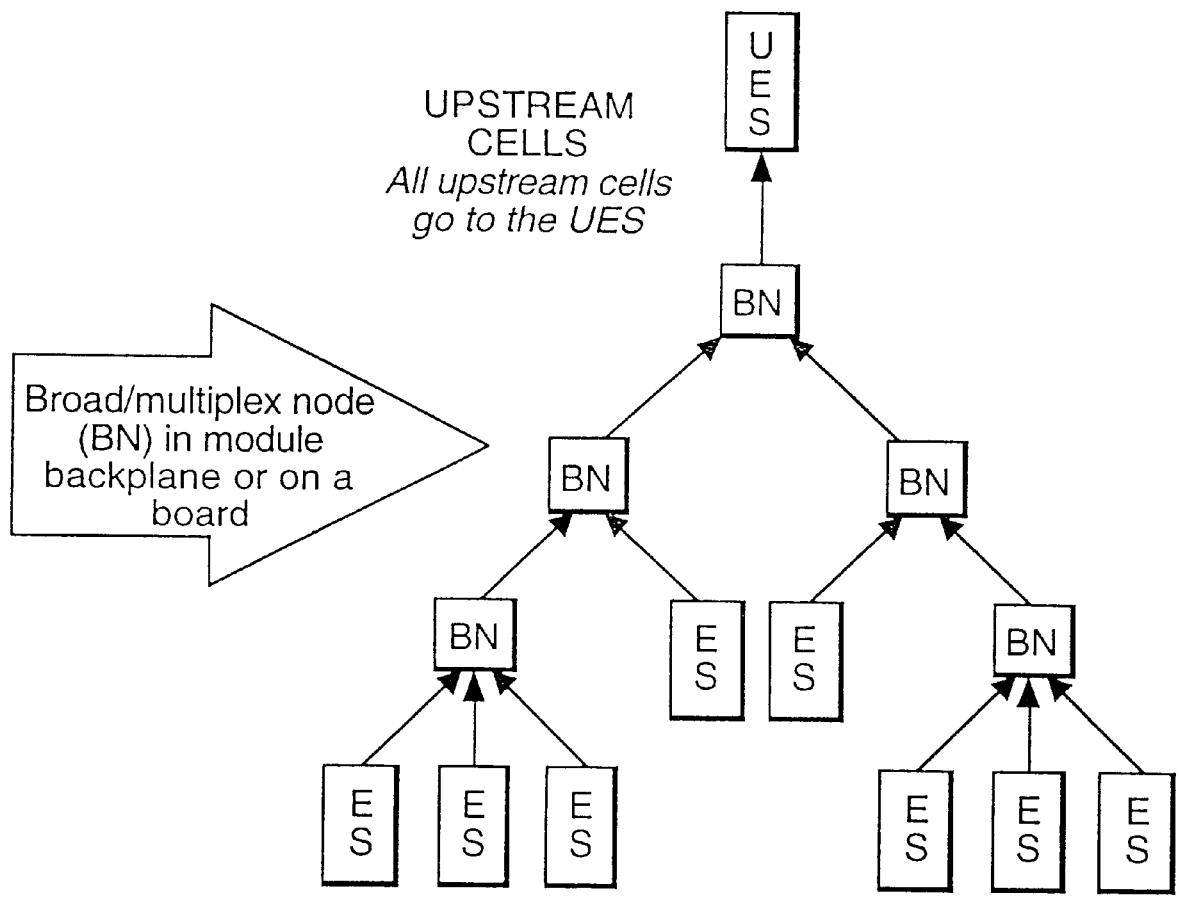
Figure 11:
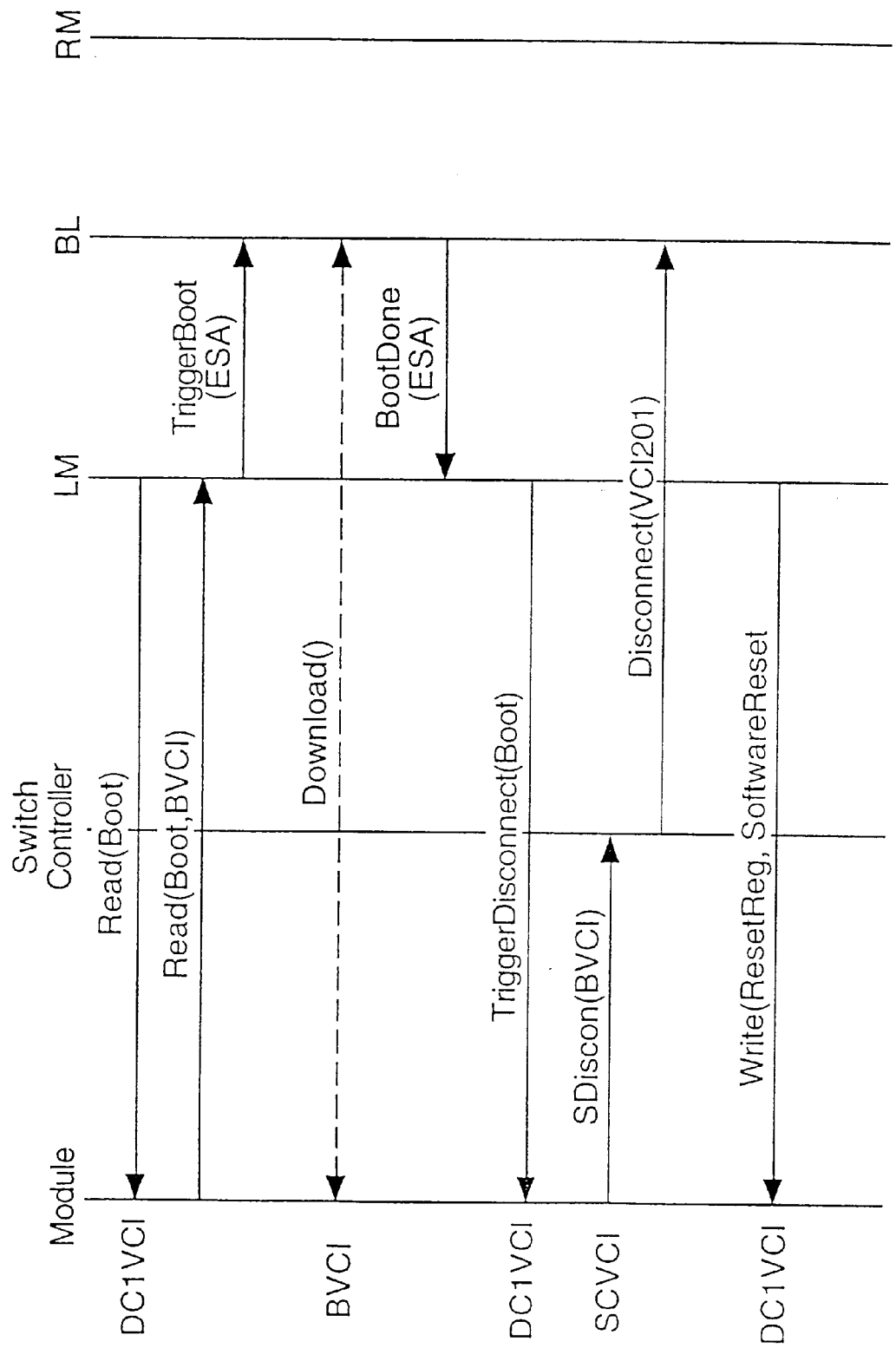
Figure 12:
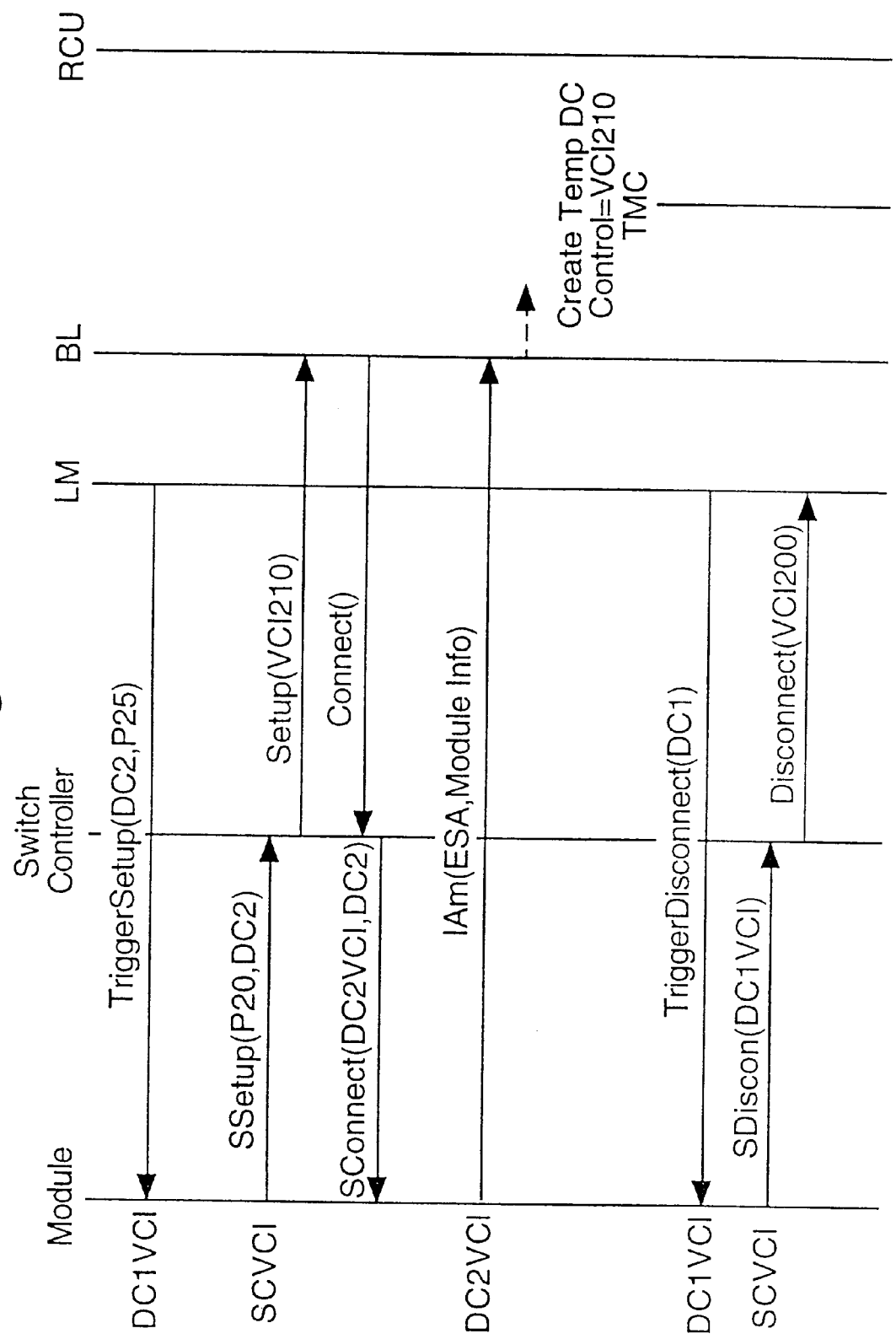
Figure 13:
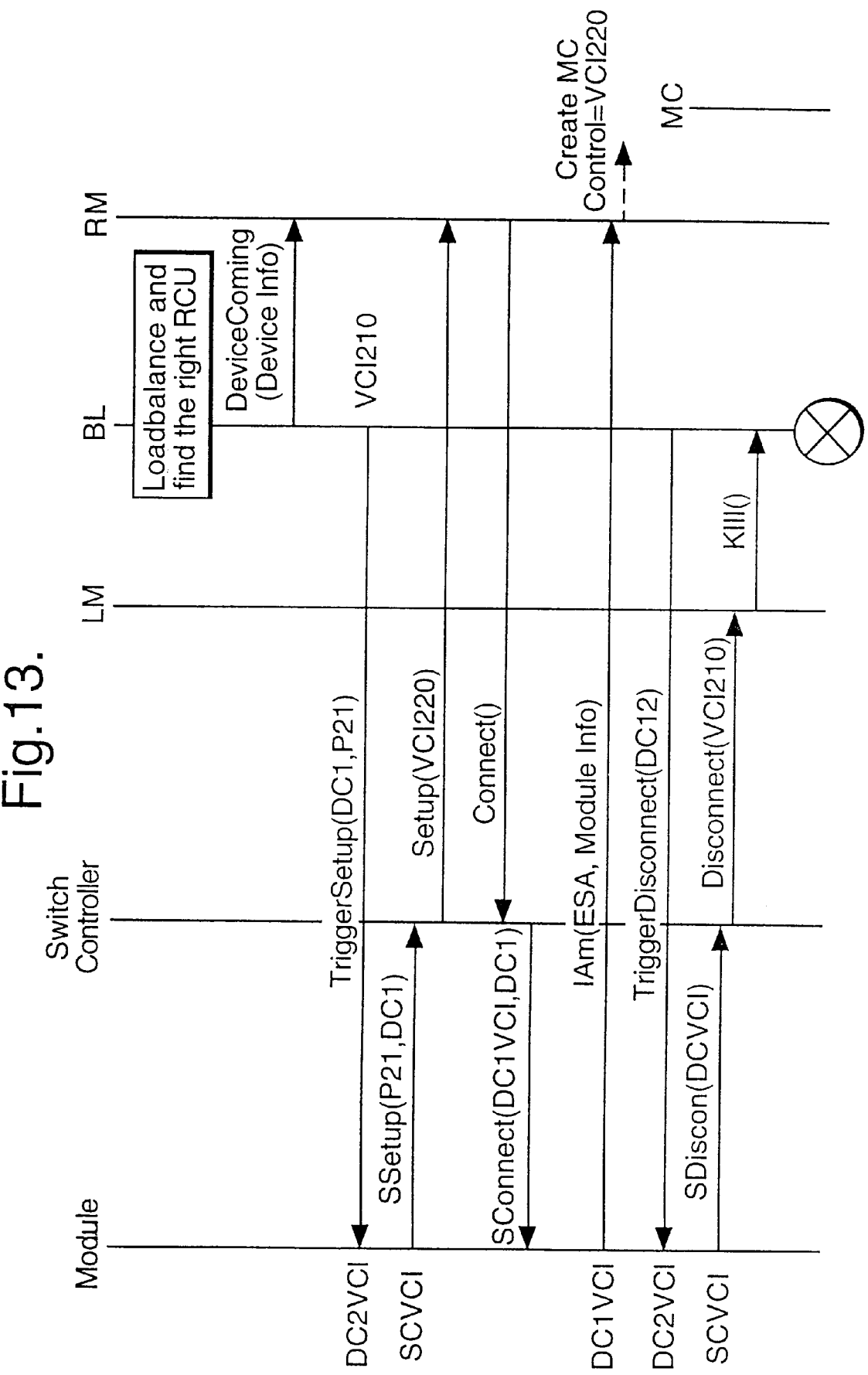
Figure 14:
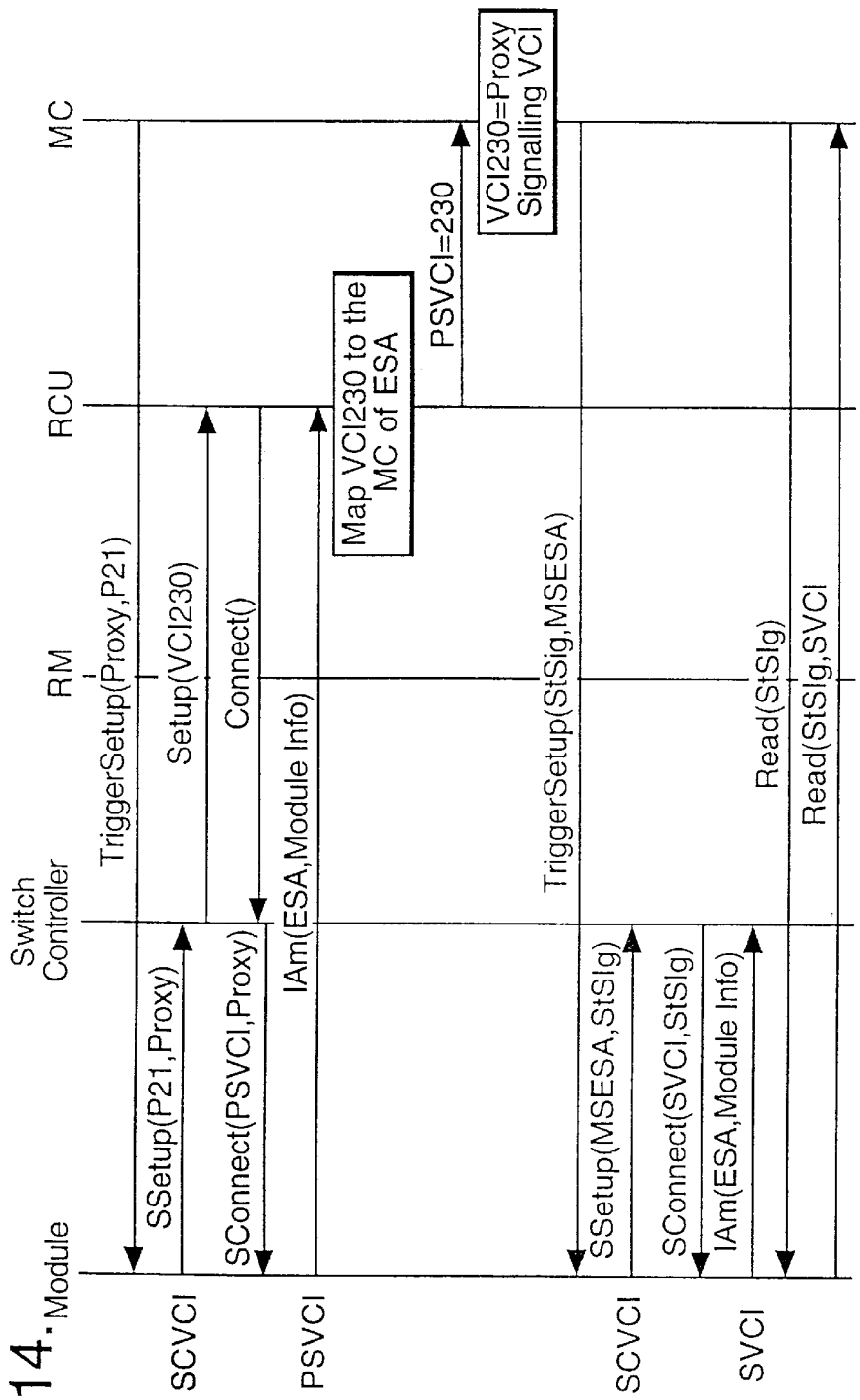

FIGS. 8a and 8b illustrate the transport of upstream and downstream cells between a plurality of end systems 81 attached to a broadcast root module and an upstream end system (UES) 82, via a tree structure comprising a number of broadcast nodes 83. Each end system 81 functions as a consumer/generator of cells at the downstream (leaf) of the network, and the upstream end system 82 functions as a consumer/generator of cells at the upstream (root) of the network. In this arrangement, cell routing is directional at each broadcast node 83 and does not require switching tables or any other initialisation. In the downstream direction, all end systems receive all cells which are broadcast down all links at each broadcast node. In the upstream direction, the end system 83 receives upstream cells which are sequentially multiplexed on to a single link at each broadcast node.

FIG. 9 shows a typical modular arrangement of broadcast nodes. In this arrangement the end systems, which are regarded as cell users, may each comprise a computing resource such as an access port. At the upstream end, the link towards the network may be from another broadcast node, i.e. not directly to a switch.

A messaging sequence for use on plug-in of a module to the network is illustrated in FIGS. 10 to 14. In simple terms, the plugging in of a module initiates the following process steps.

1. Connect to the load mapper (LM) which tells the end system where to connect its software load.

2. The end system is connected to the boot loader (BL) for downloading.

3. The load mapper tells the end system where to connect to its resource manager.

4. The end system is connected to the resource manager which determines the location of the appropriate device controller and passes this information to the end system.

5. The end system connects to the device controller.

6. The device controller tells the end system to acquire VCs for proxy signalling for default connection to the spare device controller.

In the above message sequence, device initiated connection set-ups are effected via a single cell connection protocol.

As discussed above, the ATM service of our network arrangement supports a simple single cell connection protocol which is intended for use by dedicated resource devices to access necessary services. The basic functionality is similar to the Q.2931 signalling protocol and supports the following messages.

SSetup(Sbaddress, Device MAC, VirtualRegNum, B-HLI, ESA) This message is used to connect to an endpoint. The device MAC and the VirtualRegNum fields are saved in the connection context by the switch controller and they are echoed back to the device. The ATM cluster sends a Q.2931 Setup() message to the destination.

SConnect(Sbaddress, Device MAC, VirtualRegNum, VPI/VCI) This message tells the device to listen to a particular VPI/VCI for a particular service on the device (VirtualRegNum). The device MAC ensures that only the target device listens to the VPI/VCI. The VirtualRegNum is the same one that was passed in the Setup() message.

SDisconnect(Sbaddress, Device MAC, VirtualRegNum, VPI/VCI) This message tells the device to disconnect from the VPI/VCI identified in a VirtualRegNum. The device can also use it to disconnect a VC. The ATM cluster sends a normal Q.2931 Disconnect() message to the destination.

Figure 15:
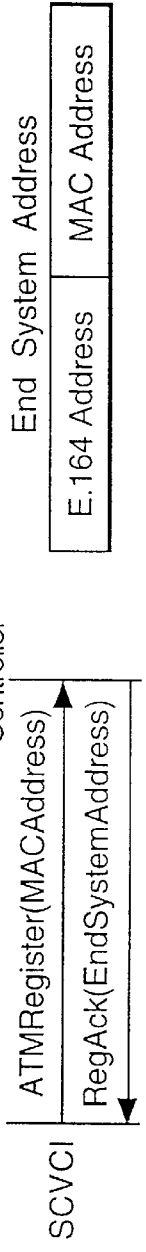
FIG. 15 illustrates in schematic form a procedure for end system registration in the network arrangement of FIG. 2.

When an end system is connected to or plugged into the network, a registration procedure ensures its discovery by the network and provides the end system with its end system address. This is illustrated schematically in FIG. 15. On connection to the network, an end system sends a message to the ATM port, using e.g. the ILMI protocol on VCI 16, and receives a reply containing the address allocated to the end system. This is the address which other systems will use to communicate with the end system. This mechanism is specified in the ATM Forum UNI specification, but the mechanism employs a single cell protocol rather than the standard ILMI protocol.

Figure 17:
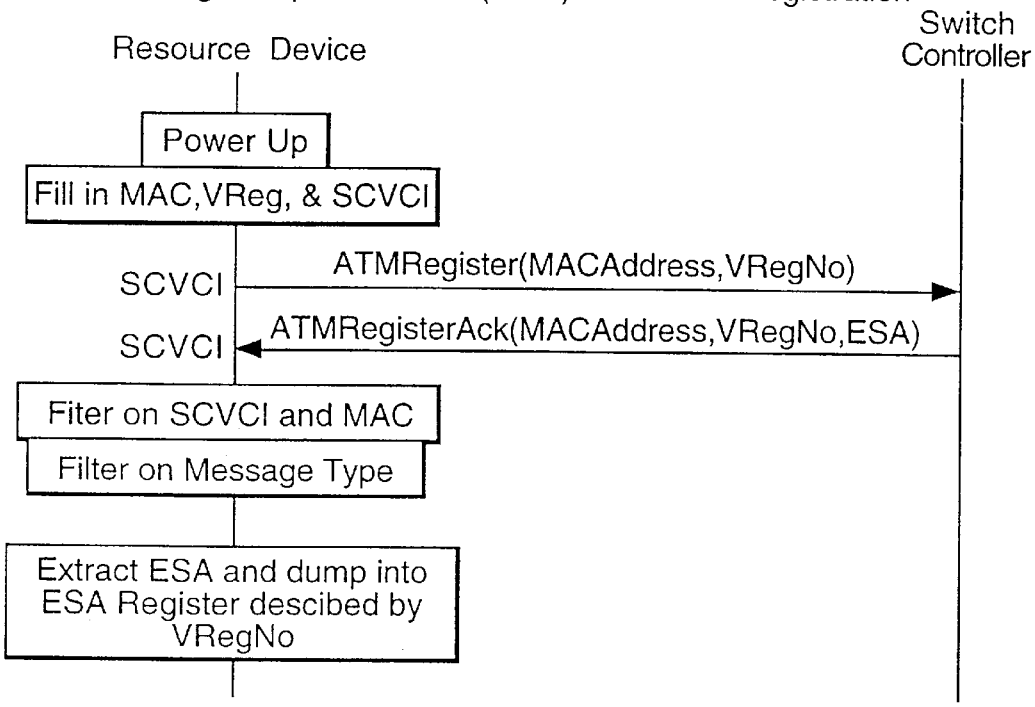
FIG. 17 shows a message sequence chart corresponding to the protocol of FIG. 16.

The registration protocol is illustrated in more detail in FIG. 16 and in the accompanying message sequence chart of FIG. 17. Referring to these two figures, the ATMRegister() message is filled in with the MAC address of the resource device and the message is sent. An ATMRegisterAck() message is returned with the end system address of the end system. The registration is performed on SCVC1 that connects to the controller of the root module.

Figure 19:
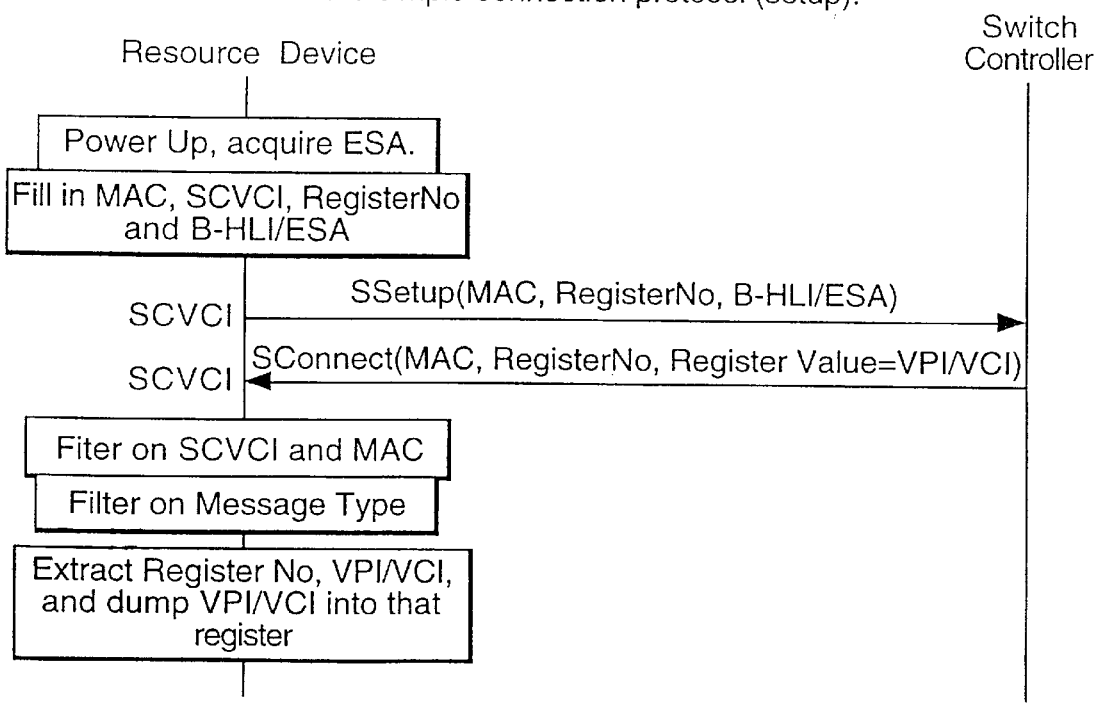
FIGS. 19 and 20 are message sequence charts illustrating respectively the set-up protocol and the disconnect protocol associated with the single cell connection protocol of FIG. 18.
Figure 20:
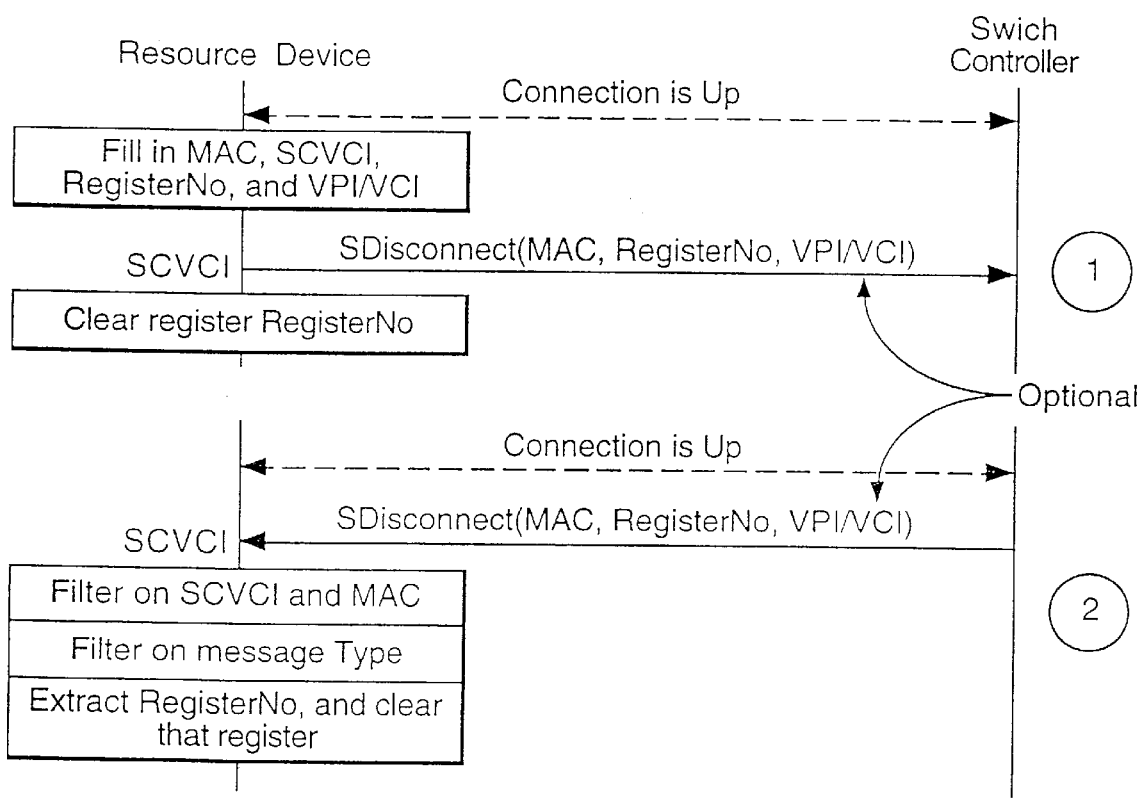

The single cell connection protocol whereby a resource device sets up simple connections is illustrated in FIG. 18. Corresponding message sequence charts for set-up and disconnection are shown in FIGS. 19 and 20 respectively. The messaging is performed on SCVC1 and comprises the following message set.

SSetup() is sent to connect a service via a virtual register number to a service access point {B-HLI, ESA}.

SConnect() is received for determining the VPI/VCI for the service (Register number).

SDisconnect is sent or received to disconnect a service (on the VPI/VCI).

The arrangement provides an effective method of providing multiple end system access to a common port of an ATM network without the need for extensive modification of an existing network. Although the technique is of particular application to the provision of a distributed computer or data processing system, it is of course by no means limited to this particular application.

We claim:

1. A method of connecting a device or end system via a device controller to an ATM network, the method comprising providing first and second virtual channels between the device controller and the end system, discovering and booting the end system via the first virtual channel, and providing proxy signalling for the end system via the second virtual channel, wherein said discovering and booting incorporates downloading of software and configuration data from the device controller to the end system so that the end system appears to the network as an intelligent ATM end system.

2. A method as claimed in claim 1, wherein said proxy signalling employs a metasignalling protocol.

3. A method as claimed in claim 2, wherein said metasignalling protocol comprises accepting a single cell from a single cell connection set up request on the second virtual channel and providing in response thereto a virtual channel indicator for standard ATM signalling.

4. An asynchronous transfer mode (ATM) communications network having a plurality of ports for coupling end systems to the network, wherein at least some of said ports are shared ports each arranged to provide shared access to the network from two or more said end devices coupled to that port; wherein the network incorporates a device controller coupled to a said end system via first and second virtual channels across the network, wherein the device controller has means for discovery and booting of said end system via the first virtual channel and proxy signalling means coupled to the end system via the second virtual channel for performing a signalling function on behalf of that end system, and wherein each said port incorporate broadcast means for broadcasting ATM cells in a downstream direction to all end systems coupled to that port, and wherein said port incorporates multiplexer means for sequentially multiplexing cells in an, upstream direction from the end systems to the network.

5. A network as claimed in claim 4, wherein each end system incorporates; ATM network services control means arranged to provide end system registration, connection set-up and ATM cell transport; an operating system providing operating system functionality; and an ATM driver providing an interface to the ATM network.

6. A network as claimed in claim 5, wherein at least some end systems incorporate system communications means providing transport and locator services over the ATM network.

7. An arrangement for connecting a device or end system to an ATM network, the arrangement comprising a device controller coupled to the end system via first and second virtual channels across the network, wherein the device controller has means for discovery and booting of the end system via the first virtual channel and proxy signalling means coupled to the end system via the second virtual channel for performing a signalling function on behalf of the end system, wherein the end system is coupled to the network via a port shared with a plurality of other end systems, wherein said port incorporates broadcast means for broadcasting ATM cells in a downstream direction to all end systems coupled to that port, wherein said port incorporates multiplexer means for sequentially multiplexing cells in an upstream direction from the end systems to the network, and wherein each end system incorporates; ATM network services control means arranged to provide end system registration, connection set-up and ATM cell transport; an operating system providing operating system functionality; and an ATM driver providing an interface to the ATM network.

8. An arrangement as claimed in claim 7, wherein at least some end systems incorporate system communications means providing transport and locator services over the ATM network.

* * * * *